(12) United States Patent
Oyanagi et al.

(10) Patent No.: US 7,581,829 B2
(45) Date of Patent: Sep. 1, 2009

(54) INK-JET RECORDING METHOD AND INK COMPOSITION SET

(75) Inventors: Takashi Oyanagi, Nagano (JP); Keitaro Nakano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 315 days.

(21) Appl. No.: 11/250,156

(22) Filed: Oct. 13, 2005

(65) Prior Publication Data

US 2006/0187285 A1 Aug. 24, 2006

(30) Foreign Application Priority Data

Oct. 13, 2004 (JP) ............................. P.2004-298544
Oct. 11, 2005 (JP) ............................. P.2005-296049

(51) Int. Cl.
*C09D 11/00* (2006.01)

(52) U.S. Cl. ..................................... 347/100; 106/31.13

(58) Field of Classification Search ................. 347/100; 106/31.13

See application file for complete search history.

(56) References Cited

U.S. PATENT DOCUMENTS

| 5,623,001 | A |  | 4/1997 | Figov | |
|---|---|---|---|---|---|
| 5,958,121 | A | * | 9/1999 | Lin | 106/31.43 |
| 6,653,367 | B2 | * | 11/2003 | Miyabayashi | 523/160 |
| 2003/0231234 | A1 | * | 12/2003 | Ushirogouchi et al. | 347/100 |
| 2004/0021753 | A1 | * | 2/2004 | Yoshihiro et al. | 347/100 |

* cited by examiner

*Primary Examiner*—Manish S Shah
*Assistant Examiner*—Laura E Martin
(74) *Attorney, Agent, or Firm*—Ladas and Parry LLP

(57) ABSTRACT

An ink composition set including an ink composition A containing at least a colorant and an interior curable photopolymerization initiator, and an ink composition B containing at least a polymerizable compound, a surface curable photopolymerization initiator and a polymerization accelerator, and an ink-jet recording method using the ink composition set.

4 Claims, 1 Drawing Sheet

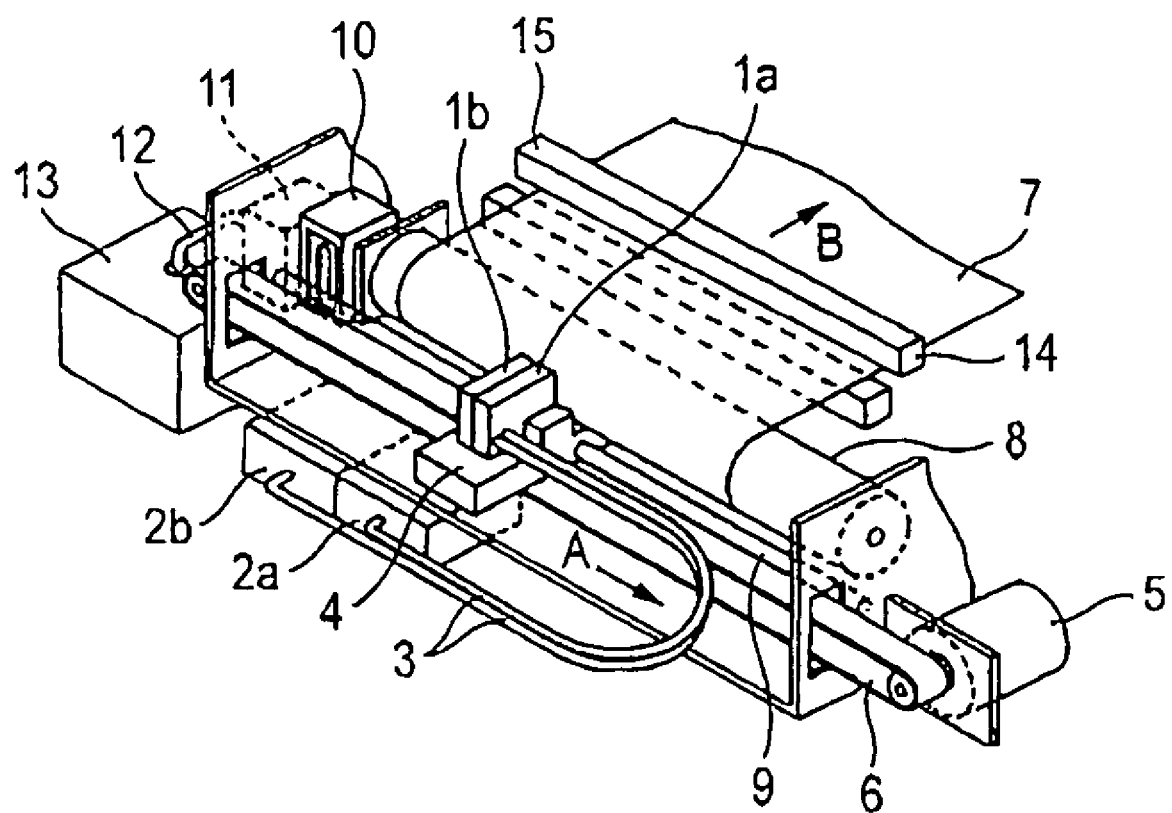

INK-JET RECORDING METHOD AND INK COMPOSITION SET

FIELD OF THE INVENTION

The present invention relates to an ink-jet recording method and an ink composition set, and more particularly, it relates to such an ink-jet recording method and an ink composition set that an ink coated film can be sufficiently cured even in the case where a two-component ink composition is printed on a recording medium to a thick film, or in the case where an ink composition having a high colorant content is printed.

BACKGROUND OF THE INVENTION

In the ink-jet recording method, small droplets of an ink composition are ejected and attached to a recording medium, such as paper, to effect printing. The ink-jet recording method has such a characteristic feature that an image having high resolution with high quality can be printed at a high speed. The ink composition used in the ink-jet recording method generally contains an aqueous solvent as a major component and also contains a colorant component and a moistening agent, such as glycerin, for preventing clogging.

In the case where the ink-jet recording method is applied to paper and fabrics to which the aqueous ink composition is difficult to penetrate, or applied to metal and plastic materials to which the aqueous ink composition does not penetrate, for example, a plate or a film made of a resin, such as a phenol resin, a melamine resin, a vinyl chloride resin, an acrylic resin and a polycarbonate resin, it is required that the ink composition or a reaction liquid contains a component capable of stably fixing the colorant component to the recording medium.

According to the requirement, an ultraviolet ray-curable ink for ink-jet recording containing a colorant, an ultraviolet curing agent (i.e., a polymerizable compound) and a polymerization (photopolymerization) initiator is disclosed (for example, in Patent Document 1). There has been stated that the ink is prevented from causing blur on a recording medium to improve image quality. The ultraviolet ray-curable ink disclosed in Patent Document 1 is an one-component ink composition.

However, in a step of curing a one-component ultraviolet ray-curable ink composition by irradiating with an ultraviolet ray after attaching the ink composition to a recording medium, such a phenomenon is often observed that the only outside (surface) of the ink coated film is cured, but the interior thereof remains as a liquid uncured. This is because an ultraviolet ray is absorbed only by the surface of the coated film but fails to reach the interior thereof. There are some cases on the other hand that only the interior is cured, but the surface is not cured. This is a phenomenon that is often observed when the polymerization rate is low, and it is considered that this is because of polymerization inhibition due to permeation of oxygen from the surface.

In order to avoid the problems, such a measure is often employed that plural kinds of photopolymerization initiators are used in combination. Specifically, a photopolymerization initiator having a high initiator efficiency (which is suitable for surface curing and can suppress polymerization inhibition due to permeation of oxygen) and a photopolymerization initiator suitable for interior curing having a photobleaching effect (in which after cleaving the photopolymerization initiator by absorbing light, the residue of the initiator after decomposition does not absorb an ultraviolet ray to fail to prevent an ultraviolet ray from penetrating into the interior) are used in combination.

Patent Document 1; U.S. Pat. No. 5,623,001

Even in the case where the plural photopolymerization initiators are combined, however, where are some cases where an ultraviolet ray is liable to be absorbed, reflected or scattered by a colorant when a one-component ink composition is coated to a thick film on a recording medium, or an ink composition having a high colorant content is coated. Accordingly, an ultraviolet ray is difficult to penetrate into the interior of the ink coated film to prevent polymerization reaction from proceeding, which brings about insufficient curing. In the case where the addition amount of the photopolymerization initiator is increased therefore, there arises such a vicious cycle that an ultraviolet ray is excessively absorbed in the ink coated film to prevent an ultraviolet ray from penetrating into the interior, which brings about curing failure.

In the invention, the problems are solved by using two or more kinds of ultraviolet ray-curable ink compositions in combination. Specifically, one of the ink compositions contains a photopolymerization initiator suitable for interior curing having a photobleaching effect (in which after cleaving the photopolymerization initiator by absorbing light, the residue of the initiator after decomposition does not absorb an ultraviolet ray to fail to prevent an ultraviolet ray from penetrating into the interior) in a large amount, and the other ink composition contains a photopolymerization initiator having a high initiator efficiency (which is suitable for surface curing and can suppress polymerization inhibition due to permeation of oxygen) and a polymerization accelerator containing fine particles having polymerizable functional groups on the surface thereof. The use of the ink compositions in combination solves the aforementioned problems of curing failure.

SUMMARY OF THE INVENTION

The invention is to solve the problems associated with the conventional art, i.e., an object of the invention is to provide such an ink-jet recording method and an ink composition set that even in the case where a thick film is printed on a recording medium, or in the case where an ink composition having a high colorant content is printed, both the surface and the interior of the recorded image on the recording medium can be sufficiently cured.

Other objects and effects of the invention will become apparent from the following description.

As a result of earnest investigations made by the inventors, the aforementioned objects of the invention were attained by the following constitutions to complete the invention.

The invention includes the following constitutions.

(1) An ink-jet recording method comprising steps of:

preparing an ink composition set comprising an ink composition A comprising at least a colorant and an interior curable photopolymerization initiator, and an ink composition B comprising at least a polymerizable compound, a surface curable photopolymerization initiator and a polymerization accelerator;

attaching the ink composition A and the ink composition B to a recording medium; and irradiating the compositions with an ultraviolet ray to form an image through ultraviolet ray curing.

(2) The ink-jet recording method according to (1) above, wherein the polymerization accelerator comprises fine particles having a polymerizable functional group.

(3) The ink-jet recording method according to (1) above, wherein the interior curable photopolymerization initiator contained in the ink composition A comprises an acylphosphine oxide as a major component contained in an amount of 60% by weight or more based on the photopolymerization initiator in the ink composition A.

(4) The ink-jet recording method according to (1) above, wherein the surface curable photopolymerization initiator contained in the ink composition B comprises an α-aminoketone as a major component contained in an amount of 60% by weight or more based on the photopolymerization initiator in the ink composition B.

(5) The ink-jet recording method according to (1) above, wherein the colorant contained in the ink composition A is a pigment.

(6) An ink composition set comprising an ink composition A comprising at least a colorant and an interior curable photopolymerization initiator, and an ink composition B comprising at least a polymerizable compound, a surface curable photopolymerization initiator and a polymerization accelerator.

According to the ink-jet recording method of the invention, the ink to be used is divided into two liquids. A colorant and a photopolymerization initiator suitable for interior curing are incorporated into one of them (ink composition A), and a polymerizable compound, a photopolymerization initiator suitable for surface curing and a polymerization initiator are incorporated into the other (ink composition B). Thus, an ink composition set comprising the above ink composition A and the above ink composition B is used, and immediately after ejecting the ink composition A onto a recording medium, the ink composition B is ejected thereto, followed by irradiating with an ultraviolet ray. Consequently, the ink composition A forms a colorant layer on the recording medium, and the ink composition B forms a transparent protective layer on the colorant layer As for the ink composition B for forming the transparent protective layer, a photopolymerization initiator suitable for surface curing is used, a proportion of a surface curing initiator is made larger than that of an interior curing initiator, and a polymerization accelerator containing fine particles having polymerizable functional groups introduced onto the surface thereof is used. Accordingly, the polymerization rate is improved, and polymerization inhibition due to permeation of oxygen is suppressed, whereby the surface of the ink coated film can be rapidly cured, and the amount of the initiator can be decreased to a minimum level.

BRIEF DESCRIPTION OF THE DRAWINGS

FIG. 1 is a perspective view showing an ink-jet recording apparatus that is preferably used in the ink-jet recording method of the invention.

The reference numerals used in the drawings denote the followings, respectively.

1*a*: recording head
1*b*: recording head
2*a*: ink tank
2*b*: ink tank
3: tube
4: carriage
5: motor
6: timing belt
7: recording medium
8: platen
9: guide
10: cap
11: aspiration pump
12: tube
13: waste ink tank
14: heater
15: ultraviolet ray irradiating means

DETAILED DESCRIPTION OF THE INVENTION

The ink-jet recording method of the invention as well as the ink composition set of the invention will be described in detail below.

The ink-jet recording method of the invention uses an ink composition set comprising two liquids, i.e., an ink composition A containing at least a colorant and an interior curable photopolymerization initiator, and an ink composition B containing at least a polymerizable compound, a surface curable photopolymerization initiator and a polymerization accelerator.

The number of the ink composition A may be determined by the image forming process. For example, in the case where the method is applied to a recording apparatus for forming a full color image with four colors, four kinds of compositions having four colors, yellow, magenta, cyan and black, respectively, are used. In addition, such an ink composition may also be used depending on necessity as a light-color ink composition of light magenta, light cyan or gray, a medium color or special color ink composition of red, green, blue, orange or violet, and a special ink composition of white or metallic color.

In the following description, the ink composition A is sometimes referred to as a "white ink composition", "color ink composition" or simply "ink composition" since it contains a colorant, and the ink composition B is sometimes referred to as a "transparent ink composition" since it contains no colorant.

The ink composition A used in the ink-jet recording method of the invention contains a photopolymerization initiator in such a manner that the interior curing property is increased, and the ink composition B contains a photopolymerization initiator in such a manner that the surface curing property is increased.

The photopolymerization initiator contained in the ink compositions A and B is, for example, a compound that forms a radical or an ion through absorption of an ultraviolet ray or a visible ray in a region of about from 200 to 450 nm to initiate polymerization of a polymerizable compound.

Representative examples of the photopolymerization initiator used in the ink compositions A and B of the invention, referring to radical-generating ones, include benzoin methyl ether, benzoin ethyl ether, isopropyl benzoin ether, isobutyl benzoin ether, 1-phenyl-1,2-propanedione-2-(o-ethoxycarbonyl)oxime, benzyl, diethoxyacetophenone, benzophenone, chlorothioxanthone, 2-chlorothioxanthone, isorpropylthioxanthone, 2-methylthioxanthone, polyphenyl polychloride and hexachlorbenzene. Preferred examples thereof include isobutyl benzoin ether and 1-phenyl-1,2-propanedione-2-(o-ethoxycarbonyl)oxime.

Commercially available photopolymerization initiators can also be used, such as those available under the trade names, e.g., Vicure 10 and 30 (all produced by Stauffer Chemical Co.), Irgacure 127, 184, 500, 651, 2959, 907, 369, 379, 754, 1700, 1800, 1850 and 819, OXE01, Darocur 1173, TPO and ITX (all produced by Ciba Specialty Chemicals, Inc.), Quantacure CTX (produced by Aceto Chemical Co.), Kayacure DETX-S (produced by Nippon Kayaku Co., Ltd.) and ESACURE KIP150 (produced by Lamberti).

In order that the ink composition A used in the ink-jet recording method of the invention contains a photopolymerization initiator to have high interior curing property as having been described, it is preferred, for example, that an acylphosphine oxide compound is used as a major component the photopolymerization initiator contained in the ink composition A, and the amount of the acylphosphine oxide compound is 60% by weight or more based on the total amount of the photopolymerization initiator contained in the ink composition A.

Examples of the acylphosphine oxide compound include those having absorption in a region of a wavelength of 365 nm or more, such as bis(2,4,6-trimethylbenzoyl)-phenylphosphine oxide, which is available under a trade name of Irgacure 819 (produced by Ciba Specialty Chemicals, Inc.).

In order that the ink composition B used in the ink-jet recording method of the invention contains a photopolymerization initiator to have high surface curing property, it is preferred, for example, that an α-aminoketone compound is used as a major component the photopolymerization initiator contained in the ink composition B, and the amount of the α-aminoketone compound is 60% by weight or more based on the total amount of the photopolymerization initiator contained in the ink composition B.

Examples of the α-aminoketone compound include those having absorption in a region of a wavelength of 365 nm or more, such as 2-benzyl-2-dimethylamino-1-(4-morpholinophenyl)-butaone-1, which is available under a trade name of Irgacure 369 (produced by Ciba Specialty Chemicals, Inc.).

While the colorant contained in the ink composition A used in the ink-jet recording method of the invention may be ether a dye or a pigment, a pigment dispersed in the ink composition is advantageous rather than a dye dissolved in the ink composition in the case where the colorant component in the ink composition is suppressed from penetrating by such a function of the ink composition as insolubilization and thickening, and a pigment is preferably used from the standpoint of durability of printed matters.

Examples of the dye that can be used in the invention include various dyes that are generally used for ink-jet recording, such as a direct dye, an acidic dye, an edible dye, a basic dye, a reactive dye, a disperse dye, a vat dye, a soluble vat dye and a reactive disperse dye.

The pigment used in the invention may be an inorganic pigment and an organic pigment without any particular limitation.

Examples of the inorganic pigment include titanium oxide, iron oxide and carbon black produced by the known process, such as the contact process, the furnace process and the thermal process. Examples of the organic pigment include an azo pigment (such as an azo lake pigment, an insoluble azo pigment, a condensed azo pigment and a chelate azo pigment), a polycyclic pigment (such as a phthalocyanine pigment, a perylene pigment, a perynone pigment, an anthraquinone pigment, a quinacridone pigment, a dioxadine pigment, a thioindigo pigment, an isoindolinone pigment and a quinophthalone pigment), a dye chelate (such as a basic dye chelate and an acidic dye chelate), a nitro pigment, a nitrso pigment and aniline black.

Specific examples of the pigment include carbon black, such as No. 2300, No. 900, MCF88, No. 33, No. 40, No. 45, No. 52, MA7, MA8, MA100 and No. 2200B, all produced by Mitsubishi Chemical Corp., Raven 5750, Raven 5250, Raven 5000, Raven 3500, Raven 1255 and Raven 700, all produced by Columbian Chemicals Company, Regal 400R, Regal 330R, Regal 660R, Mogul L, Mogul 700, Monarch 800, Monarch 880, Monarch 900, Monarch 1000, Monarch 1100, Monarch 1300 and Monarch 1400, all produced by Cabot Oil & Gas Corp., and Color Black FW1, Color Black FW2, Color Black FW2V, Color Black FW18, Color Black FW200, Color Black S150, Color Black S160, Color Black S170, Printex 35, Printex 35U, Printex 35V, Printex 140U, Special Black 6, Special Black 5, Special Black 4A and Special Black 4, all produced by Degussa AG.

Examples of the pigment used in an yellow ink include C.I. Pigment Yellow 1, 2, 3, 12, 13, 14, 16, 17, 73, 74, 75, 83, 93, 95, 97, 98, 109, 110, 114, 128, 129, 138, 150, 151, 154, 155, 180 and 185.

Examples of the pigment used in a magenta ink include C.I. Pigment Red 5, 7, 12, 48(Ca), 48(Mn), 57(Ca), 57:1, 112, 122, 123, 168, 184, 202 and 209, and C.I. Pigment Violet 19.

Examples of the pigment used in a cyan ink include C.I. Pigment Blue 1, 2, 3, 15:3, 15:4, 60, 16 and 22.

According to a preferred embodiment of the invention, the pigment preferably has an average particle diameter in a range of from 10 to 200 nm, and more preferably in a range of from 50 to 150 nm.

The addition amount of the colorant in the ink composition A is preferably in a range of about from 0.1 to 25% by weight, and more preferably in a range of from 0.5 to 15% by weight.

In a preferred embodiment of the invention, the pigment is dispersed in an aqueous medium with a dispersant or a surfactant to obtain a pigment dispersion liquid, which is then added to the ink composition A. Preferred examples of the dispersant include those dispersants that are ordinarily used for preparing a pigment dispersion liquid, such as a polymer dispersant. It is apparent to a skilled person in the art that the dispersant and the surfactant contained in the pigment dispersion liquid also function as a dispersant and a surfactant in the ink composition A.

Specific examples of the dispersant include a polymer dispersant, such as polyacrylic acid, an acrylic acid-styrene copolymer, polyester, polyurethane, polyvinyl chloride, a vinyl chloride-vinyl acetate copolymer, vinyl chloride-modified polyacrylic acid, polyoxyalkylene-added polyalkyleneamine and polyvinyl butyral, a silicone surfactant, such as polyester-modified polydimethylsiloxane and polyether-modified polydimethylsiloxane, an acetylenediol surfactant, and a sorbitan surfactant.

The ink composition A of the invention may contain an aqueous solvent, and may also contain, as arbitrary components, a resin emulsion, an inorganic oxide colloid, a wetting agent, a pH adjusting agent, an antiseptic and an antifungal agent.

The polymerizable compound contained in the ink composition B used in the ink-jet recording method of the invention is not particularly limited as far as it is a compound capable of being polymerized with a radical or an ion formed from the photopolymerization initiator.

Examples of the polymerizable compound contained in the ink composition of the invention include a monomer. The monomer used in the invention is referred to as a photopolymerizable monomer, which includes a monofunctional monomer, a bifunctional monomer and a polyfunctional monomer, examples of which are given below. The monomers to be used generally have a molecular weight in a range of about from 100 to 3,000, and preferably in a range of about from 100 to 2,000.

(Monofunctional Monomer)

Examples of the monofunctional monomer include (2-methyl-2-ethyl-1,3-dioxolan-4-yl)methyl acrylate, (2-methyl-2-isobutyl-1,3-dioxolan-4-yl)methyl acrylate, phenoxyethyl acrylate, isobornyl acrylate, N-vinylformamide, methoxydiethylene glycol monoacrylate, acryloylmorpholine, lauryl methacrylate, allyl glycol, 2-hydroxyethyl methacrylate, cyclohexyl methacrylate, oxetane methacrylate, N-vinylcarbazole, N-vinylacetamide, N-vinylpyrrolidone and N-vinylcaprolactam.

(Bifunctional Monomer)

Examples of the bifunctional monomer include ethylene glycol dimethacrylate, diethylene glycol diacrylate, diethylene glycol dimethacrylate, tripropylene glycol diacrylate, 1,9-nonanediol diacrylate, polyethylene glycol #400 diacrylate, tetraethylene glycol dimethacrylate, 1,6-hexanediol diacrylate, 1,6-hexanediol dimethacrylate, neopentyl glycol diacrylate, neopentyl glycol dimethacrylate, 2-hydroxy-1,3-dimethacryloxypropane and hydroxybioperinate ester of neopentyl glycol acrylate.

(Polyfunctional Monomer)

Examples of the polyfunctional monomer include trimethylolpropane triacrylate, trimethylolpropane trimethacrylate, trimethylolpropane EO adduct triacrylate, trimethylolpropane EO-modified triacrylate, trimethylolpropane PO adduct triacrylate, glycerin EO adduct triacrylate, glycerin PO adduct triacrylate, pentaerythritol triacrylate, dipentaerythritol hexaacrylate, (2,2,2-triacyloyloxymethyl)ethyl hydrogen phthalate and dipentaerythritol polyacrylate.

Among these monomers, preferred examples thereof include acryloylmorpholine, phenoxyethyl acrylate and N-vinylformamide (which are monofunctional monomers), tripropylene glycol diacrylate (which is a bifunctional monomer), and (2,2,2-triacyloyloxymethyl)ethyl hydrogen phthalate, dipentaerythritol polyacrylate, glycerin EO adduct triacrylate and trimethylolpropane EO-modified triacrylate (which are polyfunctional monomers).

The polymerization accelerator contained in the ink composition B used in the ink-jet recording method of the invention is preferably a polymerization accelerator containing an amine compound. The amine compound is not particularly limited, and an aminobenzoate derivative is preferred since it is free of problem in odor and secures curing of the ink composition. This is because an aminobenzoate derivative suppresses polymerization inhibition due to oxygen.

Preferred examples of the aminobenzoate derivative include those having no absorption in a wavelength range of 350 nm or more. Examples of the aminobenzoate derivative include, while not limited, ethyl-4-dimethyl aminobenzoate and 2-ethylhexyl-4-dimethyl aminobenzoate, which are commercially available under a trade name, Darocur EHA and EDB (all produced by Ciba Specialty Chemicals, Inc.).

Other examples of the polymerization initiator include fine particles having polymerizable functional groups.

While not completely clear, it is expected that the mechanism of polymerization acceleration by the fine particles having polymerizable functional groups is as follows. A radical formed by cleavage of the photopolymerization initiator through absorption of an ultraviolet ray is stabilized by trapping on the surface of the fine particles, and easily starts polymerization reaction with the polymerizable groups on the surface of the fine particles and the monomer adsorbed on the surface of the fine particles.

The fine particles having polymerizable functional groups are not particularly limited, and examples thereof include those generally referred to as a body pigment, such as an inorganic compound, e.g., silica, alumina, titania and calcium oxide, and transparent ones, such as silica and alumina, are particularly preferably used.

The polymerizable functional group that the fine particles have is not particularly limited, and examples thereof include an acryloyl group and a methacryloyl group, and also include a polymerizable functional group having one or more double bonds.

The fine particles are not particularly limited in size, and the particle diameter thereof is preferably from 10 to 100 nm.

The method for preparing the fine particles having polymerizable functional groups is not particularly limited, and examples thereof include such a method that silica fine particles having a large amount of hydroxyl groups are prepared through sol-gel reaction of a silane compound, such as tetraethoxysilane, and the hydroxyl groups are reacted with a compound (silane coupling agent) capable of adding a polymerizable functional group thereto.

The content of the fine particles having polymerizable functional groups in the ink composition B in the invention is not particularly limited, and can be appropriately determined depending on relationship among the mode and conditions of use and the viscosity and polymerization property of the ink composition. The content thereof is preferably 10% by weight or less based on the total amount of the ink composition.

The ink composition B of the invention may contain an aqueous solvent, and may also contain, as arbitrary components, a polyvalent metallic salt, a polyallylamine or a derivative thereof, a wetting agent, a pH adjusting agent, an antiseptic and an antifungal agent.

The ink compositions A and B of the invention preferably has a difference in viscosity at 25° C. of 2 mPa·s or less from the standpoint of handleability in ink-jet recording.

Both the ink compositions A and B of the invention are preferably non-solvent ink compositions containing no organic solvent.

In one embodiment of the ink-jet recording method of the invention, the ink composition A is ejected onto a recording medium, and immediately after that, the ink composition B is ejected thereto, followed by irradiating with an ultraviolet ray.

The irradiation amount of an ultraviolet ray is generally from 10 to 10,000 mJ/cm$^2$, and preferably from 50 to 6,000 mJ/cm$^2$. The curing reaction can proceed sufficiently with the irradiation amount of an ultraviolet ray in the aforementioned range.

The irradiation of an ultraviolet ray may be carried out with various lamps, such as a metal halide lamp, a xenon lamp, a carbon arc lamp, a low pressure mercury lamp and a high pressure mercury lamp. For example, a commercially available lamp, such as H Lamp, D Lamp and V Lamp, produced by Fusion System Corp., can be used.

The irradiation of an ultraviolet ray may also be carried out by using an ultraviolet ray emitting semiconductor device, such as an ultraviolet ray emitting diode (ultraviolet ray LED) and an ultraviolet ray semiconductor laser, In the ink-jet recording method of the invention, the recording medium having the ink compositions may be heated before, simultaneously with or after irradiation with an ultraviolet ray. Examples of the heating operation include a method of heating the recording medium by contacting the recording medium with a heat source, and a method of heating the recording medium without contact, e.g., irradiation with an infrared ray or microwave (electromagnetic wave having a maximum wavelength at around 2,450 MHz) and blowing with hot air.

An example of a recording apparatus for practicing the ink-jet recording method of the invention will be described.

FIG. 1 is a perspective view showing an ink-jet recording apparatus having a means for attaching the ink-jet compositions A and B to a recording medium, a driving system for driving the means, a means for conveying the recording medium, a means for irradiating the recording medium with an ultraviolet ray, a means for heating the recording medium, and a cleaning means.

Recording heads 1a and 1b are connected to an ink tank 2a containing the ink composition A and an ink tank 2b containing the ink composition B, respectively, and move in a direction shown by the arrow A along a carriage 4 with a timing belt 6 driven by a motor 5. During the movement, the ink composition A is ejected from a nozzle surface of the recording head 1a and attached to a recording medium 7 placed on a position facing the recording head 1a with a platen 8 and a guide 9. The recording medium 7 is then conveyed in a paper conveying direction shown by the arrow B at a prescribed conveying amount, during which the recording heads 1a and 1b move a direction opposite to the arrow A in the figure and return to the left-end position of the recording medium 7. The ink composition B is then ejected from a nozzle surface of the recording head 1b to effect printing on the recording medium having the ink composition A attached. The recording medium 7 thus printed is further conveyed in the paper conveying direction shown by the arrow B at a prescribed conveying amount and subjected to ultraviolet irradiation with an ultraviolet ray irradiating means 15 and heating with a heater 14. On the surface of the recording medium 7 having been subjected to the treatments, the ink compositions A and B undergo curing reaction to fix the colorant onto the recording medium 7. The recording medium 7 having been printed is further conveyed in the paper conveying direction shown by the arrow B. The apparatus has a cap 10 connected to an aspiration pump 11, by which a cleaning operation is effected. The ink compositions aspirated are stored in a waste ink tank 13 through a tube 12.

The ink-jet recording method of the invention can be applied to printing on a non-absorptive recording material, such as metal, glass and plastics, production of a color filter, and marking on a printed circuit board.

EXAMPLE

The present invention will be illustrated in greater detail with reference to the following Examples, but the invention should not be construed as being limited thereto.

Examples 1 to 8, Reference Examples 1 to 8, and Comparative Examples 1 to 24

Examples 1 to 8, Reference Examples 1 to 8, and Comparative Examples 1 to 24 shown in Table 2 below are all examples using the ink composition sets containing white ink compositions (W1 to W4, ink composition A) and transparent ink compositions (T1 to T6, ink composition B). Irgacure 819 (an interior curable photopolymerization initiator, produced by Ciba Specialty Chemicals, Inc.) and Irgacure 369 (a surface curable photopolymerization initiator, produced by Ciba Specialty Chemicals, Inc.) are used as photopolymerization initiators mixed with the ink compositions A and B, but the invention is not limited thereto.

Production Process of Titanium Dioxide Fine Particles

Titanium-containing ore was dissolved in sulfuric acid to obtain a titanium sulfate solution. To hydrated titanium oxide obtained by hydrolysis of the titanium sulfate solution, 0.50 part by weight of ammonium phosphate, 0.30 part by weight of potassium sulfate and 0.30 part by weight of aluminum sulfate were added per 100 parts by weight of $TiO_2$, and the hydrated titanium oxide was heated to a product temperature of 1,020° C. in a laboratory rotary muffle furnace. Titanium dioxide fine particles thus formed were cooled to room temperature, and observation thereof with a transmission electron microscope revealed that they had an anatase structure and a primary particle diameter of 0.13 μm. 1,500 g of the titanium dioxide fine particles having been surface-treated and 1,000 g of isopropyl alcohol (hereinafter, referred to as IPA) were mixed to obtain slurry, and the slurry was dispersed for 2 hours in a sand mill (produced by Yasukawa Manufacturing Co., Ltd.) in which zirconium beads were charged in an amount 1.5 times the slurry. The beads were removed from the slurry to obtain a 60% by weight IPA dispersion liquid (A) of titanium dioxide fine particles (B) used in a white ink for ink-jet recording.

1. White Ink Composition (Ink Composition A: Ink Composition Containing at Least Colorant and Photopolymerization Initiator)

| 1) White Ink Composition 1 (W1) (Ink Composition A) | |
|---|---|
| N-Vinylformamide (Beamset 770, produced by Arakawa Chemical Industries, Ltd.) | 60 parts by weight |
| Tripropylene glycol diacrylate (Aronix M-220, produced by Toagosei Co., Ltd.) | 30 parts by weight |
| Irgacure 819 (produced by Ciba Specialty Chemicals, Inc.) | 2.5 parts by weight |
| Irgacure 369 (produced by Ciba Specialty Chemicals, Inc.) | 0.5 part by weight |
| Darocur EHA (produced by Ciba Specialty Chemicals, Inc.) | 1 part by weight |
| Titanium dioxide fine particles (B) | 6 parts by weight |

Production Process of White Ink Composition 1

140 parts by weight of Beamset 770 and 100 parts by weight of the IPA dispersion liquid (A) were placed in a 300-mL round bottom flask, from which IPA was distilled out by using a rotary evaporator, to obtain a monomer dispersion liquid (C) containing 30% by weight of the titanium dioxide fine particles (B).

20 parts by weight of the monomer dispersion liquid (C) was placed in a light-shielded vessel, to which 46 parts by weight of Beamset 770, 30 parts by weight of Aronix M-220, 2.5 parts by weight of Irgacure 819, 0.5 part by weight of Irgacure 369 and 1 part by weight of Darocur EHA were added, followed by mixing and stirring with a magnetic stirrer for 1 hour, to prepare a white ink composition 1 (W1).

| 2) White Ink Composition 2 (W2) (Ink Composition A): | |
|---|---|
| N-Vinylformamide (Beamset 770, produced by Arakawa Chemical Industries, Ltd.) | 60 parts by weight |
| Tripropylene glycol diacrylate (Aronix M-220, produced by Toagosei Co., Ltd.) | 29 parts by weight |
| Irgacure 819 (produced by Ciba Specialty Chemicals, Inc.) | 4.0 parts by weight |
| Darocur EHA (produced by Ciba Specialty Chemicals, Inc.) | 1 part by weight |
| Titanium dioxide fine particles (B) | 6 parts by weight |

Production Process of White Ink Composition 2

20 parts by weight of the monomer dispersion liquid (C) was placed in a light-shielded vessel, to which 46 parts by weight of Beamset 770, 29 parts by weight of Aronix M-220, 4.0 parts by weight of Irgacure 819 and 1 part by weight of Darocur EHA were added, followed by mixing and stirring with a magnetic stirrer for 1 hour, to prepare a white ink composition 2 (W2).

| 3) White Ink Composition 3 (W3) (Ink Composition A): | |
|---|---|
| N-Vinylformamide (Beamset 770, produced by Arakawa Chemical Industries, Ltd.) | 60 parts by weight |
| Tripropylene glycol diacrylate (Aronix M-220, produced by Toagosei Co., Ltd.) | 29 parts by weight |
| Irgacure 369 (produced by Ciba Specialty Chemicals, Inc.) | 4.0 parts by weight |
| Darocur EHA (produced by Ciba Specialty Chemicals, Inc.) | 1 part by weight |
| Titanium dioxide fine particles (B) | 6 parts by weight |

Production Process of White Ink Composition 3

20 parts by weight of the monomer dispersion liquid (C) was placed in a light-shielded vessel, to which 46 parts by weight of Beamset 770, 29 parts by weight of Aronix M-220, 4.0 parts by weight of Irgacure 369 and 1 part by weight of Darocur EHA were added, followed by mixing and stirring with a magnetic stirrer for 1 hour, to prepare a white ink composition 3 (W3).

| 4) White Ink Composition 4 (W4) (Ink Composition A): | |
|---|---|
| N-Vinylformamide (Beamset 770, produced by Arakawa Chemical Industries, Ltd.) | 60 parts by weight |
| Tripropylene glycol diacrylate (Aronix M-220, produced by Toagosei Co., Ltd.) | 29 parts by weight |
| Irgacure 819 (produced by Ciba Specialty Chemicals, Inc.) | 2.0 parts by weight |
| Irgacure 369 (produced by Ciba Specialty Chemicals, Inc.) | 2.0 parts by weight |
| Darocur EHA (produced by Ciba Specialty Chemicals, Inc.) | 1 part by weight |
| Titanium dioxide fine particles (B) | 6 parts by weight |

Production Process of White Ink Composition 4

20 parts by weight of the monomer dispersion liquid (C) was placed in a light-shielded vessel, to which 46 parts by weight of Beamset 770, 29 parts by weight of Aronix M-220, 2.0 parts by weight of Irgacure 819, 2.0 parts by weight of Irgacure 369 and 1 part by weight of Darocur EHA were added, followed by mixing and stirring with a magnetic stirrer for 1 hour, to prepare a white ink composition 4 (W4).

2. Transparent Ink Composition (Ink Composition B: Ink Composition Containing at Least Polymerizable Compound, Photopolymerization Initiator, and Polymerization Accelerator)

| 1) Transparent Ink Composition 1 (T1): | |
|---|---|
| N-Vinylformamide (Beamset 770, produced by Arakawa Chemical Industries, Ltd.) | 59 parts by weight |
| Tripropylene glycol diacrylate (Aronix M-220, produced by Toagosei Co., Ltd.) | 20 parts by weight |
| Glycerin ethylene oxide adduct triacrylate (NK Ester A-Gly-3E, produced by Shin-nakamura Chemical Corp.) | 10 parts by weight |
| Irgacure 819 (produced by Ciba Specialty Chemicals, Inc.) | 1.5 parts by weight |
| Irgacure 369 (produced by Ciba Specialty Chemicals, Inc.) | 2.5 parts by weight |
| Darocur EHA (produced by Ciba Specialty Chemicals Inc.) | 1.0 part by weight |
| Polymerizable fine particles 1 | 6.0 parts by weight |

Production Process of Polymerizable Fine Particles 1

88.1 parts by weight of silica sol IPA-ST (an isopropyl alcohol (IPA) dispersion liquid having a silica concentration of 30% by weight, produced by Nissan Chemical Industries, Ltd.) was placed in a 200-mL conical flask, to which 7.9 parts by weight of a silane coupling agent (Sila-Ace S710, produced by Chisso Corp.) was added. Under stirring with a magnetic stirrer, 4 parts by weight of hydrochloric acid having a concentration of 0.05 mol/L was added, and reaction was carried out at room temperature under stirring for 24 hours. As a result, an IPA dispersion liquid A containing polymerizable fine particles 1.

Production Process of Transparent Ink Composition 1

70 parts by weight of N-vinylformamide (hereinafter, referred to as NVF) and 100 parts by weight of the dispersion liquid A were placed in a 300-mL round bottom flask, from which IPA was distilled out by using a rotary evaporator, to obtain a monomer solution B containing 30% by weight of the polymerizable fine particles 1.

20 parts by weight of the monomer solution B was placed in a 100-mL light-shielded sample vial, to which 45 parts by weight of NVF, 20 parts by weight of tripropylene glycol diacrylate, 10 parts by weight of glycerin ethylene oxide adduct triacrylate, 1.5 parts by weight of Irgacure 819, 2.5 parts by weight of Irgacure 369 and 1 part by weight of Darocur EHA were added, followed by stirring with a magnetic stirrer for 1 hour, to prepare a transparent ink composition 1 (T1).

| 2) Transparent Ink Composition 2 (T2): | |
|---|---|
| N-Vinylformamide (Beamset 770, produced by Arakawa Chemical Industries, Ltd.) | 59 parts by weight |
| Tripropylene glycol diacrylate (Aronix M-220, produced by Toagosei Co., Ltd.) | 20 parts by weight |

-continued

| 2) Transparent Ink Composition 2 (T2): | |
|---|---|
| Glycerin ethylene oxide adduct triacrylate (NK Ester A-Gly-3E, produced by Shin-nakamura Chemical Corp.) | 10 parts by weight |
| Irgacure 369 (produced by Ciba Specialty Chemicals, Inc.) | 4.0 parts by weight |
| Darocur EHA (produced by Ciba Specialty Chemicals, Inc.) | 1.0 part by weight |
| Polymerizable fine particles 1 | 6.0 parts by weight |

Production Process of Transparent Ink Composition 2

20 parts by weight of the monomer solution B was placed in a 100-mL light-shielded sample vial, to which 45 parts by weight of NVF, 20 parts by weight of tripropylene glycol diacrylate, 10 parts by weight of glycerin ethylene oxide adduct triacrylate, 4.0 parts by weight of Irgacure 369 and 1 part by weight of Darocur EHA were added, followed by stirring with a magnetic stirrer for 1 hour, to prepare a transparent ink composition 2 (T2).

| 3) Transparent Ink Composition 3 (T3): | |
|---|---|
| N-Vinylformamide (Beamset 770, produced by Arakawa Chemical Industries, Ltd.) | 59 parts by weight |
| Tripropylene glycol diacrylate (Aronix M-220, produced by Toagosei Co., Ltd.) | 20 parts by weight |
| Glycerin ethylene oxide adduct triacrylate (NK Ester A-Gly-3E, produced by Shin-nakamura Chemical Corp.) | 10 parts by weight |
| Irgacure 819 (produced by Ciba Specialty Chemicals, Inc.) | 4.0 parts by weight |
| Darocur EHA (produced by Ciba Specialty Chemicals, Inc.) | 1.0 part by weight |
| Polymerizable fine particles 1 | 6.0 parts by weight |

Production Process of Transparent Ink Composition 3

20 parts by weight of the monomer solution B was placed in a 100-mL light-shielded sample vial, to which 45 parts by weight of NVF, 20 parts by weight of tripropylene glycol diacrylate, 10 parts by weight of glycerin ethylene oxide adduct triacrylate, 4.0 parts by weight of Irgacure 819 and 1 part by weight of Darocur EHA were added, followed by stirring with a magnetic stirrer for 1 hour, to prepare a transparent ink composition 3 (T3).

| 4) Transparent Ink Composition 4 (T4): | |
|---|---|
| N-Vinylformamide (Beamset 770, produced by Arakawa Chemical Industries, Ltd.) | 59 parts by weight |
| Tripropylene glycol diacrylate (Aronix M-220, produced by Toagosei Co., Ltd.) | 20 parts by weight |
| Glycerin ethylene oxide adduct triacrylate (NK Ester A-Gly-3E, produced by Shin-nakamura Chemical Corp.) | 10 parts by weight |
| Irgacure 819 (produced by Ciba Specialty Chemicals, Inc.) | 2.0 parts by weight |
| Irgacure 369 (produced by Ciba Specialty Chemicals, Inc.) | 2.0 parts by weight |
| Darocur EHA (produced by Ciba Specialty Chemicals, Inc.) | 1.0 part by weight |
| Polymerizable fine particles 1 | 6.0 parts by weight |

Production Process of Transparent Ink Composition 4

20 parts by weight of the monomer solution B was placed in a 100-mL light-shielded sample vial, to which 45 parts by weight of NVF, 20 parts by weight of tripropylene glycol diacrylate, 10 parts by weight of glycerin ethylene oxide adduct triacrylate, 2.0 parts by weight of Irgacure 819, 2.0 parts by weight of Irgacure 369 and 1 part by weight of Darocur EHA were added/followed by stirring with a magnetic stirrer for 1 hour, to prepare a transparent ink composition 4 (T4).

| 5) Transparent Ink Composition 5 (T5): | |
|---|---|
| N-Vinylformamide (Beamset 770, produced by Arakawa Chemical Industries, Ltd.) | 59 parts by weight |
| Tripropylene glycol diacrylate (Aronix M-220, produced by Toagosei Co., Ltd.) | 20 parts by weight |
| Glycerin ethylene oxide adduct triacrylate (NK Ester A-Gly-3E, produced by Shin-nakamura Chemical Corp.) | 10 parts by weight |
| Darocur 1173 (produced by Ciba Specialty Chemicals, Inc.) | 4.0 parts by weight |
| Darocur EHA (produced by Ciba Specialty Chemicals, Inc.) | 1.0 part by weight |
| Polymerizable fine particles 1 | 6.0 parts by weight |

Production Process of Transparent Ink Composition 5

20 parts by weight of the monomer solution B was placed in a 100-mL light-shielded sample vial, to which 45 parts by weight of NVF, 20 parts by weight of tripropylene glycol diacrylate, 10 parts by weight of glycerin ethylene oxide adduct triacrylate, 4.0 parts by weight of Darocur 1173 and 1 part by weight of Darocur EHA were added, followed by stirring with a magnetic stirrer for 1 hour, to prepare a transparent ink composition 4 (T5).

Darocur 1173 had substantially no absorption at a wavelength of 365 nm or more, and corresponds neither to an interior curable photopolymerization initiator nor a surface curable photopolymerization initiator.

| 6) Transparent Ink Composition 6 (T6): | |
|---|---|
| N-Vinylformamide (Beamset 770, produced by Arakawa Chemical Industries, Ltd.) | 65 parts by weight |

-continued

6) Transparent Ink Composition 6 (T6):

| | |
|---|---|
| Tripropylene glycol diacrylate (Aronix M-220, produced by Toagosei Co., Ltd.) | 20 parts by weight |
| Glycerin ethylene oxide adduct triacrylate (NK Ester A-Gly-3E, produced by Shin-nakamura Chemical Corp.) | 10 parts by weight |
| Darocur 1173 (produced by Ciba Specialty Chemicals, Inc.) | 4.0 parts by weight |
| Darocur EHA (produced by Ciba Specialty Chemicals, Inc.) | 1.0 part by weight |

Production Process of Transparent Ink Composition 6

65 parts by weight of NVF, 20 parts by weight of tripropylene glycol diacrylate, 10 parts by weight of glycerin ethylene oxide adduct triacrylate, 4.0 parts by weight of Darocur 1173 and 1 part by weight of Darocur EHA were placed in a 100-mL light-shielded sample vial and stirred with a magnetic stirrer for 1 hour to prepare a transparent ink composition 6 (T6).

The chemical names of the commercially available compounds are as follows.

Darocur EHA: 2-ethylhexyl-4-dimethylaminobenzoate
Darocur 1173: 2-hydroxy-2-methyl-1-phenyl-propan-1-one The white ink compositions 1 to 4 (W1 to W4, ink composition A) and the transparent ink compositions 1 to 6 (T1 to T6, ink composition B) are shown in Table 1. The combinations of W1 to W4 and T1 to T6 used in Examples 1 to 8, Reference Examples 1 to 8, and Comparative Examples 1 to 24 are shown in Table 2.

TABLE 2

Examples 1 to 8, Reference Examples 1-8 and Comparative Examples 1-24

| | Irradiating device | White ink composition | Transparent ink composition | Curing property | Note |
|---|---|---|---|---|---|
| Example 1 | 1 | W1 | T1 | A | — |
| Example 2 | 1 | W1 | T2 | A | — |
| Example 3 | 1 | W2 | T1 | A | — |
| Example 4 | 1 | W2 | T2 | A | — |
| Example 5 | 2 | W1 | T1 | A | — |
| Example 6 | 2 | W1 | T2 | A | — |
| Example 7 | 2 | W2 | T1 | A | — |
| Example 8 | 2 | W2 | T2 | A | — |
| Comparative Example 1 | 2 | W3 | T1 | B | interior curing failure |
| Comparative Example 2 | 2 | W3 | T2 | B | interior curing failure |
| Comparative Example 3 | 1 | W3 | T1 | B | interior curing failure |
| Comparative Example 4 | 1 | W3 | T2 | B | interior curing failure |
| Comparative Example 5 | 2 | W1 | T3 | B | surface unevenly cured |
| Comparative Example 6 | 2 | W2 | T3 | B | surface unevenly cured |
| Comparative Example 7 | 1 | W1 | T3 | B | surface curing failure |
| Comparative Example 8 | 1 | W2 | T3 | B | surface curing failure |
| Reference Example 1 | 2 | W4 | T1 | B | interior curing failure |
| Reference Example 2 | 2 | W4 | T2 | B | interior curing failure |
| Reference Example 3 | 1 | W4 | T1 | B | interior curing failure |
| Reference Example 4 | 1 | W4 | T2 | B | interior curing failure |
| Reference Example 5 | 2 | W1 | T4 | B | surface unevenly cured |
| Reference Example 6 | 2 | W2 | T4 | B | surface unevenly cured |

TABLE 1

Ink compositions A and B used in Examples 1-8, Reference Examples 1-8 and Comparative Examples 1-24

| | White ink composition (A) | | | | Transparent ink composition (B) | | | | | |
|---|---|---|---|---|---|---|---|---|---|---|
| | W1 | W2 | W3 | W4 | T1 | T2 | T3 | T4 | T5 | T6 |
| Titanium dioxide fine particles (B) (white colorant) | 6 | 6 | 6 | 6 | — | — | — | — | — | — |
| N-vinylformamide (polymerizable compound, monofunctional monomer) | 60 | 60 | 60 | 60 | 59 | 59 | 59 | 59 | 59 | 65 |
| Tripropylene glycol diacrylate (polymerizable compound, bifunctional monomer) | 30 | 29 | 29 | 29 | 20 | 20 | 20 | 20 | 20 | 20 |
| Glycerin EO adduct triacrylate (polymerizable compound, polyfunctional monomer) | — | — | — | — | 10 | 10 | 10 | 10 | 10 | 10 |
| Irgacure 819 (interior curable photopolymerization initiator) | 2.5 | 4 | — | 2 | 1.5 | — | 4 | 2 | — | — |
| Irgacure 369 (surface curable photopolymerization initiator) | 0.5 | — | 4 | 2 | 2.5 | 4 | — | 2 | — | — |
| Darocur 1173 (photopolymerization initiator) | — | — | — | — | — | — | — | — | 4 | 4 |
| Darocur EHA (polymerization accelerator) | 1 | 1 | 1 | 1 | 1 | 1 | 1 | 1 | 1 | 1 |
| Polymerizable fine particles 1 (polymerization accelerator) | — | — | — | — | 6 | 6 | 6 | 6 | 6 | — |

(Note: % by weight)

TABLE 2-continued

Examples 1 to 8, Reference Examples 1-8 and Comparative Examples 1-24

| | Irradiating device | White ink composition | Transparent ink composition | Curing property | Note |
|---|---|---|---|---|---|
| Reference Example 7 | 1 | W1 | T4 | B | surface curing failure |
| Reference Example 8 | 1 | W2 | T4 | B | surface curing failure |
| Comparative Example 9 | 2 | W1 | T5 | B | surface curing failure |
| Comparative Example 10 | 2 | W2 | T5 | B | surface curing failure |
| Comparative Example 11 | 2 | W3 | T5 | C | completely not cured |
| Comparative Example 12 | 2 | W4 | T5 | C | completely not cured |
| Comparative Example 13 | 1 | W1 | T5 | B | surface curing failure |
| Comparative Example 14 | 1 | W2 | T5 | B | surface curing failure |
| Comparative Example 15 | 1 | W3 | T5 | C | completely not cured |
| Comparative Example 16 | 1 | W4 | T5 | C | completely not cured |
| Comparative Example 17 | 2 | W1 | T6 | B | surface curing failure |
| Comparative Example 18 | 2 | W2 | T6 | B | surface curing failure |
| Comparative Example 19 | 2 | W3 | T6 | B | surface curing failure |
| Comparative Example 20 | 2 | W4 | T6 | B | surface curing failure |
| Comparative Example 21 | 1 | W1 | T6 | B | surface curing failure |
| Comparative Example 22 | 1 | W2 | T6 | B | surface curing failure |
| Comparative Example 23 | 1 | W3 | T6 | B | surface curing failure |
| Comparative Example 24 | 1 | W4 | T6 | B | surface curing failure |

Examples 9 and 10, Reference Examples 9 to 12, and Comparative Examples 25 to 36

Examples 9 and 10, Reference Examples 9 to 12, and Comparative Examples 25 to 36 shown in Table 4 below are all examples using the ink composition sets containing color ink compositions (Sets 1 to 3, ink composition A) and the transparent ink compositions (T1 to T6, ink composition B).

Irgacure 819 (an interior curable photopolymerization initiator, produced by Ciba Specialty Chemicals, Inc.) and Irgacure 369 (a surface curable photopolymerization initiator, produced by Ciba Specialty Chemicals, Inc.) are used as photopolymerization initiators mixed with the color ink compositions (Sets 1 to 3, ink composition A) and specific examples of the ink composition A, but the invention is not limited thereto. Irgastab UV-10 (produced by Ciba Specialty Chemicals, Inc.) is used as a thermal polymerization inhibitor, but the invention is not limited thereto.

1. Color Ink Composition (Ink Composition A: Ink Composition Containing at Least Colorant and Photopolymerization Initiator)

1) Preparation of Color Ink Compositions 1 to 4 (Color Ink Set 1):

An ink composition 1 having the following formulation was prepared. The preparation was carried out in the following manner. 15 parts of a pigment, 1 part of a dispersant and 84 parts of N-vinylformamide (hereinafter, abbreviated as NVF) were mixed and stirred to obtain a mixture, which was then dispersed in a sand mill (produced by Yasukawa Manufacturing Co., Ltd.) along with zirconia beads (diameter: 1.5 mm) for 6 hours. Thereafter, the zirconia beads were separated with a separator to obtain a pigment dispersion liquid C.

The solvents and additives of the following formulation except for the pigment and the dispersant were then mixed and completely dissolved to prepare an ink solvent, to which the pigment dispersion liquid C was gradually added dropwise under stirring, and after completing the dropwise addition, the mixture was stirred at ordinary temperature for 30 minutes. Thereafter, the mixture was filtered with a 5-μm membrane filter to obtain a color ink composition 1. Color ink compositions 2 to 4 were prepared in the same manner.

| 2-1) Color Ink Composition 1 (Y1) | |
|---|---|
| C.I. Pigment Yellow 155 (pigment) | 3.0% by weight |
| Polyoxyalkylene-added polyalkyleneamine (dispersant, Discol N-518, produced by Dai-ichi Kogyo Seiyaku Co., Ltd.) | 1.0% by weight |
| BYK-UV3570 (polyester-modified silicone surfactant, produced by BYK Chemie Japan Co., Ltd.) | 0.5% by weight |
| NVF (produced by Arakawa Chemical Industries, Ltd.) | 20.0% by weight |
| Allyl glycol (produced by Nippon Nyukazai Co., Ltd.) | 35.3% by weight |
| Tripropylene glycol diacrylate (Aronix M-220, produced by Toagosei Co., Ltd.) | 20.0% by weight |
| Trimethylolpropane EO-modified triacrylate (Viscoat #360, produced by Osaka Organic Chemical Industry, Ltd.) | 15.0% by weight |
| Irgacure 819 (produced by Ciba Specialty Chemicals, Inc.) | 4.0% by weight |
| Irgacure 369 (produced by Ciba Specialty Chemicals, Inc.) | 1.0% by weight |
| Irgastab UV-10 (produced by Ciba Specialty Chemicals, Inc.) | 0.2% by weight |

| 2-2) Color Ink Composition 2 (M1) | |
|---|---|
| C.I. Pigment Violet 19 (pigment) | 3.0% by weight |
| Polyoxyalkylene-added polyalkyleneamine (dispersant, Discol N-518, produced by Dai-ichi Kogyo Seiyaku Co., Ltd.) | 1.0% by weight |
| BYK-UV3570 (polyester-modified silicone surfactant, produced by BYK Chemie Japan Co., Ltd.) | 0.5% by weight |
| NVF (produced by Arakawa Chemical Industries, Ltd.) | 20.0% by weight |
| Allyl glycol (produced by Nippon Nyukazai Co., Ltd.) | 35.3% by weight |
| Tripropylene glycol diacrylate (Aronix M-220, produced by Toagosei Co., Ltd.) | 20.0% by weight |
| Trimethylolpropane EO-modified triacrylate | 15.0% by weight |

-continued

| | |
|---|---|
| (Viscoat #360, produced by Osaka Organic Chemical Industry, Ltd.) | |
| Irgacure 819 | 4.0% by weight |
| (produced by Ciba Specialty Chemicals, Inc.) | |
| Irgacure 369 | 1.0% by weight |
| (produced by Ciba Specialty Chemicals, Inc.) | |
| Irgastab UV-10 | 0.2% by weight |
| (produced by Ciba Specialty Chemicals, Inc.) | |
| 2-3) Color Ink Composition 3 (C1) | |
| C.I. Pigment Blue 15:3 (pigment) | 3.0% by weight |
| Polyoxyalkylene-added polyalkyleneamine | 1.0% by weight |
| (dispersant, Discol N-518, produced by Dai-ichi Kogyo Seiyaku Co., Ltd.) | |
| BYK-UV3570 | 0.5% by weight |
| (polyester-modified silicone surfactant, produced by BYK Chemie Japan Co., Ltd.) | |
| NVF | 20.0% by weight |
| (produced by Arakawa Chemical Industries, Ltd.) | |
| Allyl glycol | 35.3% by weight |
| (produced by Nippon Nyukazai Co., Ltd.) | |
| Tripropylene glycol diacrylate | 20.0% by weight |
| (Aronix M-220, produced by Toagosei Co., Ltd.) | |
| Trimethylolpropane EO-modified triacrylate | 15.0% by weight |
| (Viscoat #360, produced by Osaka Organic Chemical Industry, Ltd.) | |
| Irgacure 819 | 4.0% by weight |
| (produced by Ciba Specialty Chemicals, Inc.) | |
| Irgacure 369 | 1.0% by weight |
| (produced by Ciba Specialty Chemicals, Inc.) | |
| Irgastab UV-10 | 0.2% by weight |
| (produced by Ciba Specialty Chemicals, Inc.) | |
| 2-4) Color Ink Composition 4 (Bk1) | |
| C.I. Pigment Black 7 (pigment) | 3.0% by weight |
| Polyoxyalkylene-added polyalkyleneamine | 2.0% by weight |
| (dispersant, Discol N-518, produced by Dai-ichi Kogyo Seiyaku Co., Ltd.) | |
| BYK-UV3570 | 0.5% by weight |
| (polyester-modified silicone surfactant, produced by BYK Chemie Japan Co., Ltd.) | |
| NVF | 20.0% by weight |
| (produced by Arakawa Chemical Industries, Ltd.) | |
| Allyl glycol | 34.3% by weight |
| (produced by Nippon Nyukazai Co., Ltd.) | |
| Tripropylene glycol diacrylate | 20.0% by weight |
| (Aronix M-220, produced by Toagosei Co., Ltd.) | |
| Trimethylolpropane EO-modified triacrylate | 15.0% by weight |
| (Viscoat #360, produced by Osaka Organic Chemical Industry, Ltd.) | |
| Irgacure 819 | 4.0% by weight |
| (produced by Ciba Specialty Chemicals, Inc.) | |
| Irgacure 369 | 1.0% by weight |
| (produced by Ciba Specialty Chemicals, Inc.) | |
| Irgastab UV-10 | 0.2% by weight |
| (produced by Ciba Specialty Chemicals, Inc.) | |

3) Preparation of Color Ink Compositions 5 to 8 (Color Ink Set 2):

Ink compositions having the following formulation were prepared. The preparation was carried out in the same manner as in the preparation of the color ink composition 1 except that the proportion of the polymerization initiator was changed.

| | |
|---|---|
| 3-1) Color Ink Composition 5 (Y2) | |
| C.I. Pigment Yellow 155 (pigment) | 3.0% by weight |
| Polyoxyalkylene-added polyalkyleneamine | 1.0% by weight |
| (dispersant, Discol N-518, produced by Dai-ichi Kogyo Seiyaku Co., Ltd.) | |
| BYK-UV3570 | 0.5% by weight |
| (polyester-modified silicone surfactant, produced by BYK Chemie Japan Co., Ltd.) | |
| NVF | 24.0% by weight |
| (produced by Arakawa Chemical Industries, Ltd.) | |
| Lauryl methacrylate | 31.3% by weight |
| (produced by Mitsubishi Gas Chemical Co., Inc.) | |
| Tripropylene glycol diacrylate | 20.0% by weight |
| (Aronix M-220, produced by Toagosei Co., Ltd.) | |
| Trimethylolpropane EO-modified triacrylate | 15.0% by weight |
| (Viscoat #360, produced by Osaka Organic Chemical Industry, Ltd.) | |
| Irgacure 819 | 2.5% by weight |
| (produced by Ciba Specialty Chemicals, Inc.) | |
| Irgacure 369 | 2.5% by weight |
| (produced by Ciba Specialty Chemicals, Inc.) | |
| Irgastab UV-10 | 0.2% by weight |
| (produced by Ciba Specialty Chemicals, Inc.) | |
| 3-2) Color Ink Composition 6 (M2) | |
| C.I. Pigment Violet 19 (pigment) | 3.0% by weight |
| Polyoxyalkylene-added polyalkyleneamine | 1.0% by weight |
| (dispersant, Discol N-518, produced by Dai-ichi Kogyo Seiyaku Co., Ltd.) | |
| BYK-UV3570 | 0.5% by weight |
| (polyester-modified silicone surfactant, produced by BYK Chemie Japan Co., Ltd.) | |
| NVF | 24.0% by weight |
| (produced by Arakawa Chemical Industries, Ltd.) | |
| Lauryl methacrylate | 31.3% by weight |
| (produced by Mitsubishi Gas Chemical Co., Inc.) | |
| Tripropylene glycol diacrylate | 20.0% by weight |
| (Aronix M-220, produced by Toagosei Co., Ltd.) | |
| Trimethylolpropane EO-modified triacrylate | 15.0% by weight |
| (Viscoat #360, produced by Osaka Organic Chemical Industry, Ltd.) | |
| Irgacure 819 | 2.5% by weight |
| (produced by Ciba Specialty Chemicals, Inc.) | |
| Irgacure 369 | 2.5% by weight |
| (produced by Ciba Specialty Chemicals, Inc.) | |
| Irgastab UV-10 | 0.2% by weight |
| (produced by Ciba Specialty Chemicals, Inc.) | |
| 3-3) Color Ink Composition 7 (C2) | |
| C.I. Pigment Blue 15:3 (pigment) | 3.0% by weight |
| Polyoxyalkylene-added polyalkyleneamine | 1.0% by weight |
| (dispersant, Discol N-518, produced by Dai-ichi Kogyo Seiyaku Co., Ltd.) | |
| BYK-UV3570 | 0.5% by weight |
| (polyester-modified silicone surfactant, produced by BYK Chemie Japan Co., Ltd.) | |
| NVF | 24.0% by weight |
| (produced by Arakawa Chemical Industries, Ltd.) | |

-continued

| | |
|---|---|
| Lauryl methacrylate (produced by Mitsubishi Gas Chemical Co., Inc.) | 31.3% by weight |
| Tripropylene glycol diacrylate (Aronix M-220, produced by Toagosei Co., Ltd.) | 20.0% by weight |
| Trimethylolpropane EO-modified triacrylate (Viscoat #360, produced by Osaka Organic Chemical Industry, Ltd.) | 15.0% by weight |
| Irgacure 819 (produced by Ciba Specialty Chemicals, Inc.) | 2.5% by weight |
| Irgacure 369 (produced by Ciba Specialty Chemicals, Inc.) | 2.5% by weight |
| Irgastab UV-10 (produced by Ciba Specialty Chemicals, Inc.) | 0.2% by weight |

3-4) Color Ink Composition 8 (Bk2)

| | |
|---|---|
| C.I. Pigment Black 7 (pigment) | 3.0% by weight |
| Polyoxyalkylene-added polyalkyleneamine (dispersant, Discol N-518, produced by Dai-ichi Kogyo Seiyaku Co., Ltd.) | 2.0% by weight |
| BYK-UV3570 (polyester-modified silicone surfactant, produced by BYK Chemie Japan Co., Ltd.) | 0.5% by weight |
| NVF (produced by Arakawa Chemical Industries, Ltd.) | 24.0% by weight |
| Lauryl methacrylate (produced by Mitsubishi Gas Chemical Co., Inc.) | 30.3% by weight |
| Tripropylene glycol diacrylate (Aronix M-220, produced by Toagosei Co., Ltd.) | 20.0% by weight |
| Trimethylolpropane EO-modified triacrylate (Viscoat #360, produced by Osaka Organic Chemical Industry, Ltd.) | 15.0% by weight |
| Irgacure 819 (produced by Ciba Specialty Chemicals, Inc.) | 2.5% by weight |
| Irgacure 369 (produced by Ciba Specialty Chemicals, Inc.) | 2.5% by weight |
| Irgastab UV-10 (produced by Ciba Specialty Chemicals, Inc.) | 0.2% by weight |

4) Preparation of Color Ink Compositions 9 to 12 (Color Ink Set 3):

Ink compositions having the following formulation were prepared. The preparation was carried out in the same manner as in the preparation of the color ink composition 1 except that the polymerization initiator was changed.

4-1) Color Ink Composition 9 (Y3)

| | |
|---|---|
| C.I. Pigment Yellow 155 (pigment) | 3.0% by weight |
| Polyoxyalkylene-added polyalkyleneamine (dispersant, Discol N-518, produced by Dai-ichi Kogyo Seiyaku Co., Ltd.) | 1.0% by weight |
| BYK-UV3570 (polyester-modified silicone surfactant, produced by BYK Chemie Japan Co., Ltd.) | 0.5% by weight |
| NVF (produced by Arakawa Chemical Industries, Ltd.) | 24.0% by weight |
| Lauryl methacrylate (produced by Mitsubishi Gas Chemical Co., Inc.) | 31.3% by weight |
| Tripropylene glycol diacrylate (Aronix M-220, produced by Toagosei Co., Ltd.) | 20.0% by weight |
| Trimethylolpropane EO-modified triacrylate (Viscoat #360, produced by Osaka Organic Chemical Industry, Ltd.) | 15.0% by weight |
| Irgacure 369 (produced by Ciba Specialty Chemicals, Inc.) | 5.0% by weight |
| Irgastab UV-10 (produced by Ciba Specialty Chemicals, Inc.) | 0.2% by weight |

4-2) Color Ink Composition 10 (M3)

| | |
|---|---|
| C.I. Pigment Violet 19 (pigment) | 3.0% by weight |
| Polyoxyalkylene-added polyalkyleneamine (dispersant, Discol N-518, produced by Dai-ichi Kogyo Seiyaku Co., Ltd.) | 1.0% by weight |
| BYK-UV3570 (polyester-modified silicone surfactant, produced by BYK Chemie Japan Co., Ltd.) | 0.5% by weight |
| NVF (produced by Arakawa Chemical Industries, Ltd.) | 24.0% by weight |
| Lauryl methacrylate (produced by Mitsubishi Gas Chemical Co., Inc.) | 31.3% by weight |
| Tripropylene glycol diacrylate (Aronix M-220, produced by Toagosei Co., Ltd.) | 20.0% by weight |
| Trimethylolpropane EO-modified triacrylate (Viscoat #360, produced by Osaka Organic Chemical Industry, Ltd.) | 15.0% by weight |
| Irgacure 369 (produced by Ciba Specialty Chemicals, Inc.) | 5.0% by weight |
| Irgastab UV-10 (produced by Ciba Specialty Chemicals, Inc.) | 0.2% by weight |

4-3) Color Ink Composition 11 (C3)

| | |
|---|---|
| C.I. Pigment Blue 15:3 (pigment) | 3.0% by weight |
| Polyoxyalkylene-added polyalkyleneamine (dispersant, Discol N-518, produced by Dai-ichi Kogyo Seiyaku Co., Ltd.) | 1.0% by weight |
| BYK-UV3570 (polyester-modified silicone surfactant, produced by BYK Chemie Japan Co., Ltd.) | 0.5% by weight |
| NVF (produced by Arakawa Chemical Industries, Ltd.) | 24.0% by weight |
| Lauryl methacrylate (produced by Mitsubishi Gas Chemical Co., Inc.) | 31.3% by weight |
| Tripropylene glycol diacrylate (Aronix M-220, produced by Toagosei Co., Ltd.) | 20.0% by weight |
| Trimethylolpropane EO-modified triacrylate (Viscoat #360, produced by Osaka Organic Chemical Industry, Ltd.) | 15.0% by weight |
| Irgacure 369 (produced by Ciba Specialty Chemicals, Inc.) | 5.0% by weight |
| Irgastab UV-10 (produced by Ciba Specialty Chemicals, Inc.) | 0.2% by weight |

4-4) Color Ink Composition 12 (Bk3)

| | |
|---|---|
| C.I. Pigment Black 7 (pigment) | 3.0% by weight |
| Polyoxyalkylene-added polyalkyleneamine (dispersant, Discol N-518, produced by Dai-ichi Kogyo Seiyaku Co., Ltd.) | 2.0% by weight |
| BYK-UV3570 (polyester-modified silicone surfactant, produced by BYK Chemie Japan Co., Ltd.) | 0.5% by weight |

-continued

| | |
|---|---|
| NVF (produced by Arakawa Chemical Industries, Ltd.) | 24.0% by weight |
| Lauryl methacrylate (produced by Mitsubishi Gas Chemical Co., Inc.) | 30.3% by weight |
| Tripropylene glycol diacrylate (Aronix M-220, produced by Toagosei Co., Ltd.) | 20.0% by weight |
| Trimethylolpropane EO-modified triacrylate (Viscoat #360, produced by Osaka Organic Chemical Industry, Ltd.) | 15.0% by weight |
| Irgacure 369 (produced by Ciba Specialty Chemicals, Inc.) | 5.0% by weight |
| Irgastab UV-10 (produced by Ciba Specialty Chemicals, Inc.) | 0.2% by weight |

The ink sets 1 to 3 (Y1 to Y3, M1 to M3, C1 to C3, and Bk1 to Bk3) (ink composition A) are summarized in Table 3. The combinations used in Examples 9 and 10, Reference Examples 9 to 12, and Comparative Examples 25 to 36, i.e., the combinations of the ink sets 1 to 3 (ink composition A) and the transparent ink compositions T1 to T6 (ink composition B) used in Examples 1 to 8, Reference Examples 1 to 8, and Comparative Examples 1 to 24, are shown in Table 4.

TABLE 3

Color ink set used in Examples 9-10, Reference Examples 9-12 and Comparative Examples 25-36

| | Color ink set | | | | | | | | | | | |
|---|---|---|---|---|---|---|---|---|---|---|---|---|
| | Set 1 | | | | Set 2 | | | | Set 3 | | | |
| | Y1 | M1 | C1 | Bk1 | Y2 | M2 | C2 | Bk3 | Y3 | M3 | C3 | Bk3 |
| C.I. Pigment Yellow 155 (colorant, yellow pigment) | 3 | — | — | — | 3 | — | — | — | 3 | — | — | — |
| C.I. Pigment Violet 19 (colorant, magenta pigment) | — | 3 | — | — | — | 3 | — | — | — | 3 | — | — |
| C.I. Pigment Blue 15:3 (colorant, cyan pigment) | — | — | 3 | — | — | — | 3 | — | — | — | 3 | — |
| C.I. Pigment black 7 (colorant, black pigment) | — | — | — | 3 | — | — | — | 3 | — | — | — | 3 |
| Polyoxyalkylene-added polyalkyleneamine (dispersant) | 1 | 1 | 1 | 2 | 1 | 1 | 1 | 2 | 1 | 1 | 1 | 2 |
| BYK-UV3570 (surfactant) | 0.5 | 0.5 | 0.5 | 0.5 | 0.5 | 0.5 | 0.5 | 0.5 | 0.5 | 0.5 | 0.5 | 0.5 |
| N-vinylformamide (NVF) (polymerizable compound, monofunctional monomer) | 20 | 20 | 20 | 20 | 24 | 24 | 24 | 24 | 24 | 24 | 24 | 24 |
| Lauryl methacrylate (polymerizable compound, monofunctional monomer) | — | — | — | — | 31.3 | 31.3 | 31.3 | 30.3 | 31.3 | 31.3 | 31.3 | 30.3 |
| Allyl glycol (polymerizable compound, monofunctional monomer) | 35.3 | 35.3 | 35.3 | 34.3 | — | — | — | — | — | — | — | — |
| Tripropylene glycol diacrylate (polymerizable compound, bifunctional monomer) | 20 | 20 | 20 | 20 | 20 | 20 | 20 | 20 | 20 | 20 | 20 | 20 |
| Trimethylolpropane EO-modified triacrylate (polymerizable compound, polyfunctional monomer) | 15 | 15 | 15 | 15 | 15 | 15 | 15 | 15 | 15 | 15 | 15 | 15 |
| Irgacure 819 (interior curable photopolymerization initiator) | 4 | 4 | 4 | 4 | 2.5 | 2.5 | 2.5 | 2.5 | — | — | — | — |
| Irgacure 369 (surface curable photopolymerization initiator) | 1 | 1 | 1 | 1 | 2.5 | 2.5 | 2.5 | 2.5 | 5 | 5 | 5 | 5 |
| Irgastab UV-10 (thermal polymerization inhibitor) | 0.2 | 0.2 | 0.2 | 0.2 | 0.2 | 0.2 | 0.2 | 02 | 0.2 | 02 | 0.2 | 0.2 |

(Note: % by weight)

TABLE 4

| | Color ink composition | Transparent ink composition | Curing property |
|---|---|---|---|
| Example 9 | Set 1 (Y1 + M1 + C1 + Bk1) | T1 | A |
| Example 10 | Set 1 (Y1 + M1 + C1 + Bk1) | T2 | A |
| Comparative Example 25 | Set 1 (Y1 + M1 + C1 + Bk1) | T3 | B |
| Reference Example 9 | Set 1 (Y1 + M1 + C1 + Bk1) | T4 | B |
| Comparative Example 26 | Set 1 (Y1 + M1 + C1 + Bk1) | T5 | B |
| Comparative Example 27 | Set 1 (Y1 + M1 + C1 + Bk1) | T6 | B |
| Reference Example 10 | Set 2 (Y2 + M2 + C2 + Bk2) | T1 | B |
| Reference Example 11 | Set 2 (Y2 + M2 + C2 + Bk2) | T2 | B |
| Comparative Example 28 | Set 2 (Y2 + M2 + C2 + Bk2) | T3 | B |
| Reference Example 12 | Set 2 (Y2 + M2 + C2 + Bk2) | T4 | B |
| Comparative Example 29 | Set 2 (Y2 + M2 + C2 + Bk2) | T5 | C |
| Comparative Example 30 | Set 2 (Y2 + M2 + C2 + Bk2) | T6 | B |
| Comparative Example 31 | Set 3 (Y3 + M3 + C3 + Bk3) | T1 | B |

TABLE 4-continued

|  | Color ink composition | Transparent ink composition | Curing property |
|---|---|---|---|
| Comparative Example 32 | Set 3 (Y3 + M3 + C3 + Bk3) | T2 | B |
| Comparative Example 33 | Set 3 (Y3 + M3 + C3 + Bk3) | T3 | B |
| Comparative Example 34 | Set 3 (Y3 + M3 + C3 + Bk3) | T4 | B |
| Comparative Example 35 | Set 3 (Y3 + M3 + C3 + Bk3) | T5 | C |
| Comparative Example 36 | Set 3 (Y3 + M3 + C3 + Bk3) | T6 | B |

The following Printing Test 1 (curing test) was carried out for Examples 1 to 8, Reference Examples 1 to 8, and Comparative Examples 1 to 24. The evaluation results are shown in Table 2.

Printing Test 1: Curing Test

An ink-jet printer (PM-G900, produced by Seiko Epson Corp.) was used. The ink compositions were charged in separate nozzle rows according to the combinations shown in Table 1 below, and a solid pattern was printed under such conditions that the ink compositions were simultaneously ejected under ordinary temperature and ordinary pressure. The printing conditions were set in such a manner that the white ink composition (ink composition A) was attached to a recording medium, and thereafter the transparent ink composition (ink composition B) was attached to the recording medium. An OHP film of A4 size (XEROX FILM (without frame), produced by Fuji Xerox Co., Ltd.) was used as the recording medium. The recording medium was then subjected to printing and curing treatments with an ultraviolet ray irradiating device provided at a paper delivery outlet. The curing property was evaluated visually.

The following two kinds of ultraviolet ray irradiating devices were used in the test.

Irradiating Device 1:
Light source: UV LED UCCU033 (produced by Nichia Corp.)
Output power: 100 mW
Peak wavelength: 365 nm
Irradiation condition: 22 mW/cm$^2$
Accumulated light amount: 264 mJ/cm$^2$ Irradiating Device 2:
Light source: UV LED US365D (produced by Nitride Semiconductors Co., Ltd.)
Output power: 2 mW
Peak wavelength: 365 nm
Irradiation condition: 1.5 mW/cm$^2$
Accumulated light amount: 90 mJ/cm$^2$ Evaluation Standard of Curing Property
A: Both the surface and the interior were completely cured.
B: Only the surface was cured, but the interior was in a liquid state; only the interior was cured, but the surface was not cured; or the surface was separated to a cured part and an uncured part to form an uneven state.
C: The compositions were not cured but remained in a liquid state.

The following Printing Test 2 (curing test) was carried out for Examples 9 and 10, Reference Examples 9 to 12, and Comparative Examples 25 to 36. The evaluation results are shown in Table 4.

Printing Test 2; Curing Test

An ink-jet printer (PM-G900, produced by Seiko Epson Corp.) was used. The ink compositions were charged in separate nozzle rows according to the combinations shown in Table 4, and the transparent ink compositions were charged in a G0 row. A full color image was printed under such conditions that the ink compositions were simultaneously ejected under ordinary temperature and ordinary pressure. An OHP film of A4 size (XEROX FILM (without frame), produced by Fuji Xerox Co., Ltd.) was used as the recording medium. The recording medium was then subjected to printing and curing treatments with an ultraviolet ray irradiating device 1 provided at a paper delivery outlet under such curing conditions that the accumulated light amount at 365 nm was 1,320 mJ/cm$^2$. The curing property was evaluated visually in the same manner as above.

While the present invention has been described in detail and with reference to specific embodiments thereof, it will be apparent to one skilled in the art that various changes and modifications can be made therein without departing from the spirit and scope thereof.

This application is based on Japanese Patent Application Nos. 2004-298544 and 2005-296049.

What is claimed is:

1. An ink-jet recording method comprising the steps of:
   (a) preparing an ink composition set comprising (i) an ink composition A comprising at least a colorant and an interior curable photopolymerization initiator, wherein the interior curable photopolymerization initiator contained in the ink composition A comprises an acylphosphine oxide as a major component contained in an amount of 60% by weight or more based on the photopolymerization initiator in the ink composition A and (ii) an ink composition B comprising at least a polymerizable compound, a surface curable photopolymerization initiator and a polymerization accelerator, wherein the surface curable photopolymerization initiator contained in the ink composition B comprises an α-aminoketone as a major component contained in an amount of 60% by weight or more based on the photopolymerization initiator in the ink composition B;
   (b) attaching the ink composition A and the ink composition B to a recording medium by (i) ejecting the ink composition A to form a first, colorant layer on the recording medium; and then (ii) ejecting the ink composition B to form a second layer on the colorant layer formed in step (b) (i); and
   (c) irradiating the ejected compositions with an ultraviolet ray to form an image through ultraviolet ray curing.

2. The ink-jet recording method as claimed in claim 1, wherein the polymerization accelerator comprises fine particles having a polymerizable functional group.

3. The ink-jet recording method as claimed in claim 1, wherein the ink composition B is a transparent ink composition and the colorant contained in the ink composition A is a pigment.

4. An ink composition set comprising (a) an ink composition A comprising at least a colorant and an interior curable photopolymerization initiator, wherein the interior curable photopolymerization initiator contained in the ink composition A comprises an acylphosphine oxide as a major component contained in an amount of 60% by weight or more based on the photopolymerization initiator of the ink composition A; and (b) an ink composition B comprising at least a polymerizable compound, a surface curable photopolymerization initiator and a polymerization accelerator, wherein the surface curable photopolymerization initiator contained in the ink composition B comprises an a-aminoketone as a major component contained in an amount of 60% by weight or more based on the photopolymerization initiator in the ink composition B.

* * * * *